(12) United States Patent
Veros et al.

(10) Patent No.: US 8,944,093 B2
(45) Date of Patent: *Feb. 3, 2015

(54) WATERWAY ADAPTER

(71) Applicant: Masco Corporation of Indiana, Indianapolis, IN (US)

(72) Inventors: Michael J. Veros, Carmel, IN (US); Timothy J. Sailors, Jr., Westfield, IN (US); Alfred C. Nelson, Westfield, IN (US); Kurt J. Thomas, Indianapolis, IN (US)

(73) Assignees: Masco Corporation of Indiana, Indianapolis, IN (US); Mercury Plastics, Inc., Middlefield, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/793,468

(22) Filed: Mar. 11, 2013

(65) Prior Publication Data

US 2013/0186482 A1 Jul. 25, 2013

Related U.S. Application Data

(63) Continuation of application No. 12/854,541, filed on Aug. 11, 2010, now Pat. No. 8,453,669.

(60) Provisional application No. 61/366,410, filed on Jul. 21, 2010.

(51) Int. Cl.
| | | |
|---|---|---|
| *F16K 27/00* | (2006.01) | |
| *F16K 11/00* | (2006.01) | |
| *E03C 1/04* | (2006.01) | |
| *F16K 11/06* | (2006.01) | |
| *F16K 11/078* | (2006.01) | |

(Continued)

(52) U.S. Cl.
CPC . *F16K 11/06* (2013.01); *E03C 1/04* (2013.01); *E03C 1/0403* (2013.01); *F16K 11/0787* (2013.01); *F16K 19/006* (2013.01); *F16K 27/045* (2013.01); *G05D 23/1858* (2013.01)
USPC ........................ 137/315.13; 137/625.4; 4/677

(58) Field of Classification Search
USPC ............... 137/315.12, 315.13, 625.4, 625.41, 137/801; 4/675–678, 695
See application file for complete search history.

(56) References Cited

U.S. PATENT DOCUMENTS

| | | |
|---|---|---|
| 4,043,359 A | 8/1977 | Christo |
| 5,558,128 A | 9/1996 | Pawelzik et al. |
| 6,058,972 A | 5/2000 | Kahle et al. |

(Continued)

FOREIGN PATENT DOCUMENTS

| | | |
|---|---|---|
| WO | WO2007/139605 A1 | 12/2007 |
| WO | WO2010/099397 A1 | 9/2010 |

OTHER PUBLICATIONS

Moen Incorporated, Instruction pamphlet for One-Handle Kitchen Faucet, Models 7100 and 7106, INS1632A, 6 pages, May 2008.

(Continued)

*Primary Examiner* — Stephen M Hepperle
*Assistant Examiner* — Kevin Barss
(74) *Attorney, Agent, or Firm* — Faegre Baker Daniels LLP

(57) ABSTRACT

A fluid delivery device includes a waterway assembly, a valve assembly, and a waterway adapter that fluidly couples the waterway assembly to the valve assembly. An illustrative waterway adapter may be constructed of a polymeric material.

20 Claims, 11 Drawing Sheets

(51) Int. Cl.
  *F16K 27/04*    (2006.01)
  *G05D 23/185*   (2006.01)

(56)             References Cited

U.S. PATENT DOCUMENTS

| 6,154,897 | A   | 12/2000 | Paini |
| 6,185,760 | B1  | 2/2001  | Park |
| 6,289,531 | B1  | 9/2001  | Kahle et al. |
| 6,371,163 | B1  | 4/2002  | Kahle et al. |
| 6,757,921 | B2  | 7/2004  | Esche |
| 6,868,564 | B2  | 3/2005  | Ginter et al. |
| 7,159,252 | B2  | 1/2007  | Underbrink et al. |
| 7,182,100 | B2  | 2/2007  | Pinette |
| 7,556,061 | B2  | 7/2009  | Morita et al. |
| 7,980,268 | B2  | 7/2011  | Rosko et al. |
| 8,240,326 | B2  | 8/2012  | Kacik et al. |
| 8,453,669 | B2* | 6/2013  | Veros et al. ............ 137/315.13 |
| 2004/0010848 | A1 | 1/2004 | Esche |
| 2004/0221385 | A1 | 11/2004 | Su |
| 2006/0151034 | A1 | 7/2006 | Klein |
| 2007/0271695 | A1 | 11/2007 | Thomas et al. |
| 2008/0276367 | A1 | 11/2008 | Bares et al. |
| 2009/0001310 | A1* | 1/2009 | Hanson ..................... 251/366 |
| 2009/0020177 | A1 | 1/2009 | Nelson et al. |
| 2009/0242058 | A1 | 10/2009 | Hansen |
| 2010/0006166 | A1 | 1/2010 | Chen et al. |
| 2010/0127202 | A1 | 5/2010 | Bors et al. |
| 2010/0313979 | A1 | 12/2010 | Thomas et al. |
| 2011/0016625 | A1 | 1/2011 | Marty et al. |
| 2011/0297248 | A1 | 12/2011 | Nelson et al. |
| 2012/0018020 | A1 | 1/2012 | Moore et al. |

OTHER PUBLICATIONS

Moen Incorporated, Specifications for Single-Handle Single-Hole Mount High Arc Kitchen Faucet, Models 7100 and 7106, 2 pages, Aug. 2009.

Moen Incorporated, Illustrated Parts for Single-Handle Kitchen Faucet, Models 7100, 7100CSL, 7106, and 7106CSL, 3 pages, Mar. 2010.

Moen One-Handle Kitchen Faucet Model 7100, (shown with faucet body disassembled), 6 pages, available on or before May 16, 2010.

International Searching Authority, International Search Report and Written Opinion for International Application No. PCT/US2011/044612, mailed Jan. 9, 2012, 9 pages.

* cited by examiner

WATERWAY ADAPTER

CROSS-REFERENCE TO RELATED APPLICATIONS

The present application is a continuation of U.S. patent application Ser. No. 12/854,541, filed Aug. 11, 2010, now U.S. Pat. No. 8,453,669, which claims priority to U.S. Provisional Patent Application Ser. No. 61/366,410, filed Jul. 21, 2010, both entitled "WATERWAY ADAPTER," the disclosures of which are expressly incorporated by reference herein.

BACKGROUND AND SUMMARY OF THE INVENTION

The present invention relates generally to plumbing fixtures and, more particularly, to a faucet including a waterway adapter.

Single handle faucets typically include mixing valves that control the flow of both hot and cold water to a delivery spout. These faucets have found wide acceptance and are commonly constructed such that a handle or knob is movable in distinct directions to adjust the temperature and flow rate of the outlet water stream by controlling the mixture of hot and cold inlet water streams.

Conventional mixing valves typically include a machined brass body and associated brass fittings. The brass body usually includes a hot water inlet, a cold water inlet, and a mixed water outlet. An adjustable valve element, typically either a mixing ball or a slidable plate, is manipulated by a handle to control the aforementioned temperature and flow rate of the outlet water stream. In conventional faucets, copper tubes are usually brazed to the inlets and the outlet(s) of the valve body and to associated fittings. Following the brazing operation, an etching or bright dip operation is typically performed to clean the metal surfaces of contaminants.

It may be appreciated that such conventional mixing valves have certain disadvantages. For example, the cost of copper tubing and the additional assembly cost associated with the brazing and bright dipping operations may be significant. The bright dipping operation may also result in the undesirable deposit of metal on the valve body. As such, it is known that the use of polymeric materials for waterways may reduce cost, eliminate metal contact, and provide protection against acidic and other aggressive water conditions. The use of non-metallic materials in plumbing fixtures is significant given the growing concern about the quality of potable water. The U.S. Environmental Protection Agency (EPA), National Sanitary Foundation (NSF) International, and other health-related organizations, are actively seeking to reduce the amount of metal, such as copper and lead, in water.

According to an illustrative embodiment of the present disclosure, a fluid delivery device is provided including a generally hollow hub including: a body portion having a longitudinally disposed first open end and a laterally disposed valve portion having a second open end, the body portion of the hub configured to rest atop a surface, the second open end of the valve portion disposed substantially perpendicular to the first open end of the body portion; a waterway assembly including an inlet transport component and an outlet transport component; a valve assembly removably coupled to the valve portion of the hub, the valve assembly including an inlet port and an outlet port; at least one fastener; and a waterway adapter removably coupled to the body portion of the hub, the waterway adapter sized for insertion into the first open end of the body portion, the waterway adapter defining an inlet channel and an outlet channel, the inlet channel of the waterway adapter fluidly coupling the inlet transport component of the waterway assembly to the inlet port of the valve assembly, and the outlet channel of the waterway adapter fluidly coupling the outlet transport component of the waterway assembly to the outlet port of the valve assembly, the inlet transport component of the waterway assembly being removably coupled to the inlet channel of the waterway adapter via the at least one fastener, and the outlet transport component of the waterway assembly being removably coupled to the outlet channel of the waterway adapter via the at least one fastener.

According to another illustrative embodiment of the present disclosure, a fluid delivery device is provided including: a hub including a body portion disposed along a generally vertical axis and a valve portion disposed along a generally horizontal axis, the body portion of the hub including an internal wall that defines a hollow interior of the hub, the body portion further including an open top end and an open bottom end, the generally vertical axis extending through the open top and bottom ends of the body portion of the hub; a waterway assembly including an inlet transport component and an outlet transport component; a valve assembly configured for insertion into the valve portion of the hub along the generally horizontal axis, the valve assembly including an inlet port and an outlet port; and a waterway adapter configured for insertion into the body portion of the hub along the generally vertical axis, the waterway adapter defining an inlet channel and an outlet channel, the inlet channel of the waterway adapter fluidly coupling the inlet transport component of the waterway assembly to the inlet port of the valve assembly, and the outlet channel of the waterway adapter fluidly coupling the outlet transport component of the waterway assembly to the outlet port of the valve assembly, the waterway adapter being forced against the internal wall of the hub to resist removal of the waterway adapter from the body portion of the hub along the generally vertical axis, the generally vertical axis of the hub intersecting the waterway adapter when the waterway adapter is forced against the internal wall of the hub.

According to yet another illustrative embodiment of the present disclosure, a fluid delivery device is provided including: a hub; a waterway assembly including an inlet transport component, an outlet transport component, a collar located inside the hub, the collar supporting the inlet and outlet transport components, an inlet nipple fluidly coupled to the inlet transport component and extending beyond the collar, the inlet nipple including a plurality of external barbs that engage the inlet transport component, and an outlet nipple fluidly coupled to the outlet transport component and extending beyond the collar, the outlet nipple including a plurality of external barbs that engage the outlet transport component; a valve assembly including an inlet port and an outlet port; and a waterway adapter coupled to the hub, the waterway adapter defining an inlet channel and an outlet channel, the inlet channel of the waterway adapter receiving the inlet nipple of the waterway assembly to fluidly couple the inlet transport component of the waterway assembly to the inlet port of the valve assembly, and the outlet channel of the waterway adapter receiving the outlet nipple of the waterway assembly to fluidly couple the outlet transport component of the waterway assembly to the outlet port of the valve assembly.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

Figure 1:
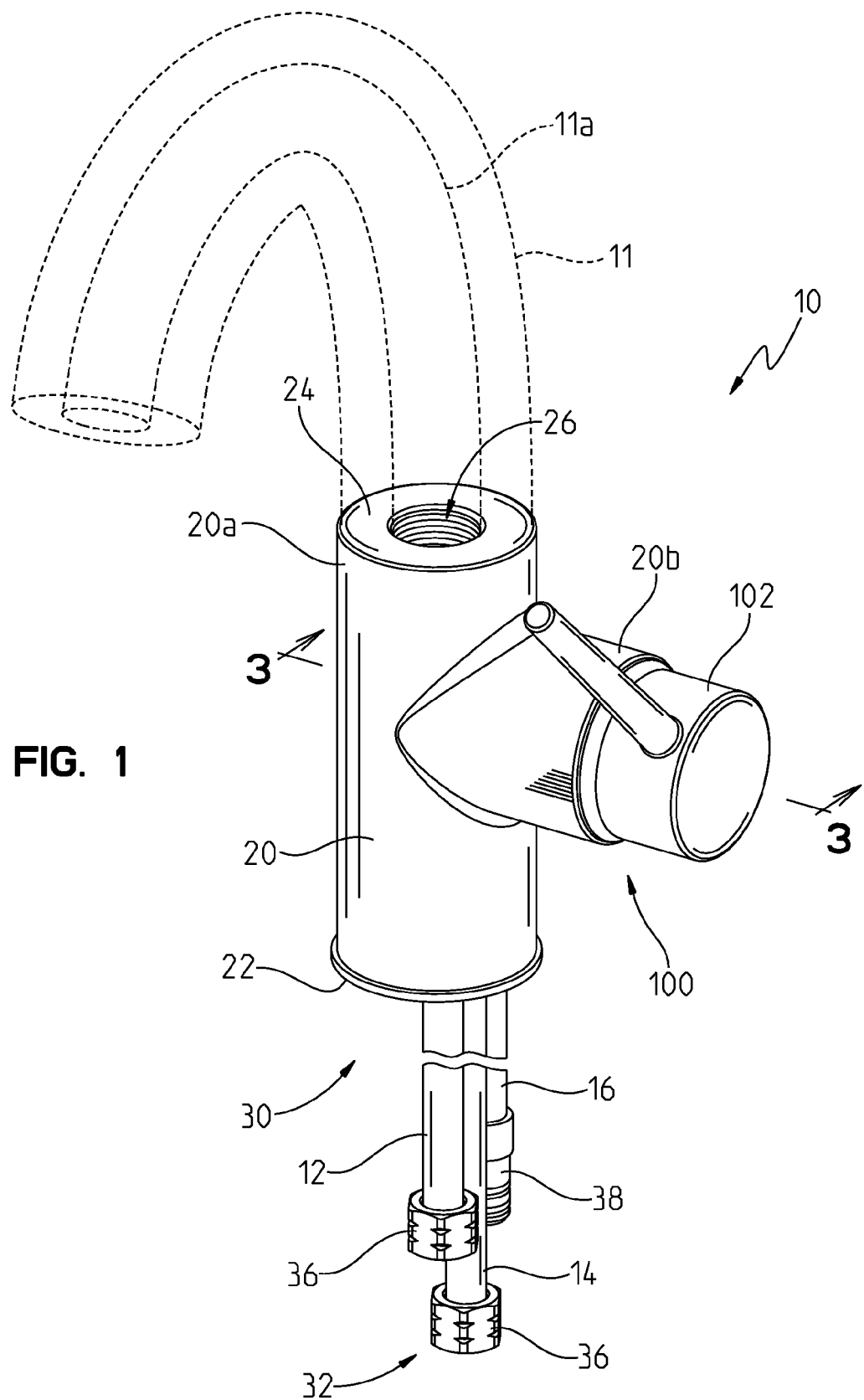
FIG. 1 is a perspective view of an illustrative embodiment faucet of the present disclosure.

The embodiments of the invention described herein are not intended to be exhaustive or to limit the invention to precise forms disclosed. Rather, the embodiments selected for description have been chosen to enable one skilled in the art to practice the invention. Although the disclosure is described in connection with water, it should be understood that additional types of fluids may be used.

Referring to FIGS. 1-4, an illustrative embodiment faucet 10 is shown including spout body 11 (shown in phantom), hub 20, waterway assembly 30, waterway adapter 60, and valve assembly 100. In operation, faucet 10 receives water from hot and cold water supplies (not shown) and mixes the incoming water to form an outlet stream. Faucet 10 may be mounted to a sink deck (not shown) or another suitable surface and may deliver the mixed outlet stream into a sink basin (not shown), for example.

Figure 2:
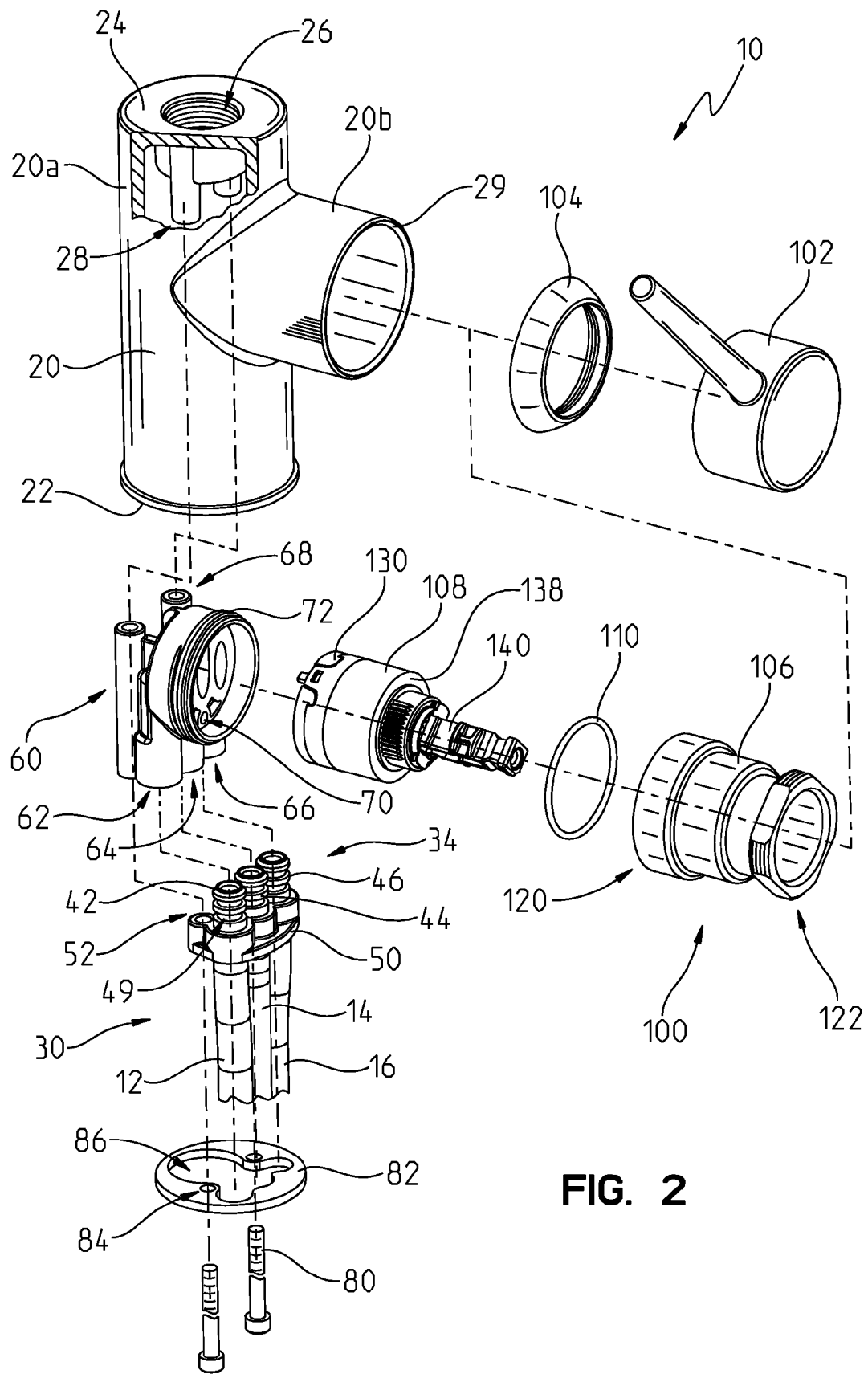
FIG. 2 is an exploded perspective view of the faucet of FIG. 1.

With reference to FIG. 2, the illustrative hub 20 of faucet 10 is a generally hollow component having a vertically disposed body portion 20a and a horizontally disposed valve portion 20b extending transversely therefrom. Body portion 20a of hub 20 includes an open bottom end 22 that is configured to rest against the sink deck (not shown) or other suitable surface. Body portion 20a of hub 20 also includes top end 24 that is configured to mate with spout body 11 (FIG. 1). As shown in FIG. 2, top end 24 of body portion 20a includes an internally threaded bore 26 that may be sized to receive and engage an externally threaded spout body 11, for example, thereby securing spout body 11 onto hub 20. Hub 20 may also define one or more internally threaded bores 28 for receiving screws 80 therein, as discussed further below. Like body portion 20a of hub 20, valve portion 20b of hub 20 also includes an open end 29. As shown in FIG. 2, open end 22 is longitudinally disposed and open end 29 is laterally disposed at a substantially 90 degree angle from open end 22.

Hub 20 of faucet may be formed of a traditional metallic material, such as zinc or brass. It is also within the scope of the present disclosure that hub 20 may be formed of a non-metallic material, such as a polymer, illustratively a cross-linkable polymer. Suitable non-metallic materials that may be used to construct hub 20 include cross-linkable polyethylene (PEX), polybutylene terephthalate (PBT), polyester, melamine, melamine urea, and melamine phenolic.

With continued reference to FIG. 2, the illustrative waterway assembly 30 of faucet 10 includes hot water inlet tube 12, cold water inlet tube 14, and outlet tube 16. Hot and cold water inlet tubes 12, 14, of waterway assembly 30 may be fluidly coupled to hot and cold water supplies (not shown), respectively, for receiving water into faucet 10. Outlet tube 16 of waterway assembly 30 may be fluidly coupled to a spout tube (not shown) for delivering water from faucet 10. Each tube 12, 14, 16, extends between first end 32 and an opposing second end 34.

As shown in FIG. 1, first end 32 of each tube 12, 14, 16, extends freely beneath hub 20. First ends 32 of hot and cold water inlet tubes 12, 14, may include conventional fluid couplings, such as nuts 36, for fluidly coupling hot and cold inlet tubes 12, 14, onto the hot and cold water supplies, respectively. First end 32 of outlet tube 16 may include tip 38 for fluidly coupling outlet tube 16 into spout tube 11a that extends upwardly through spout body 11 to dispense water from faucet 10.

Figure 3:
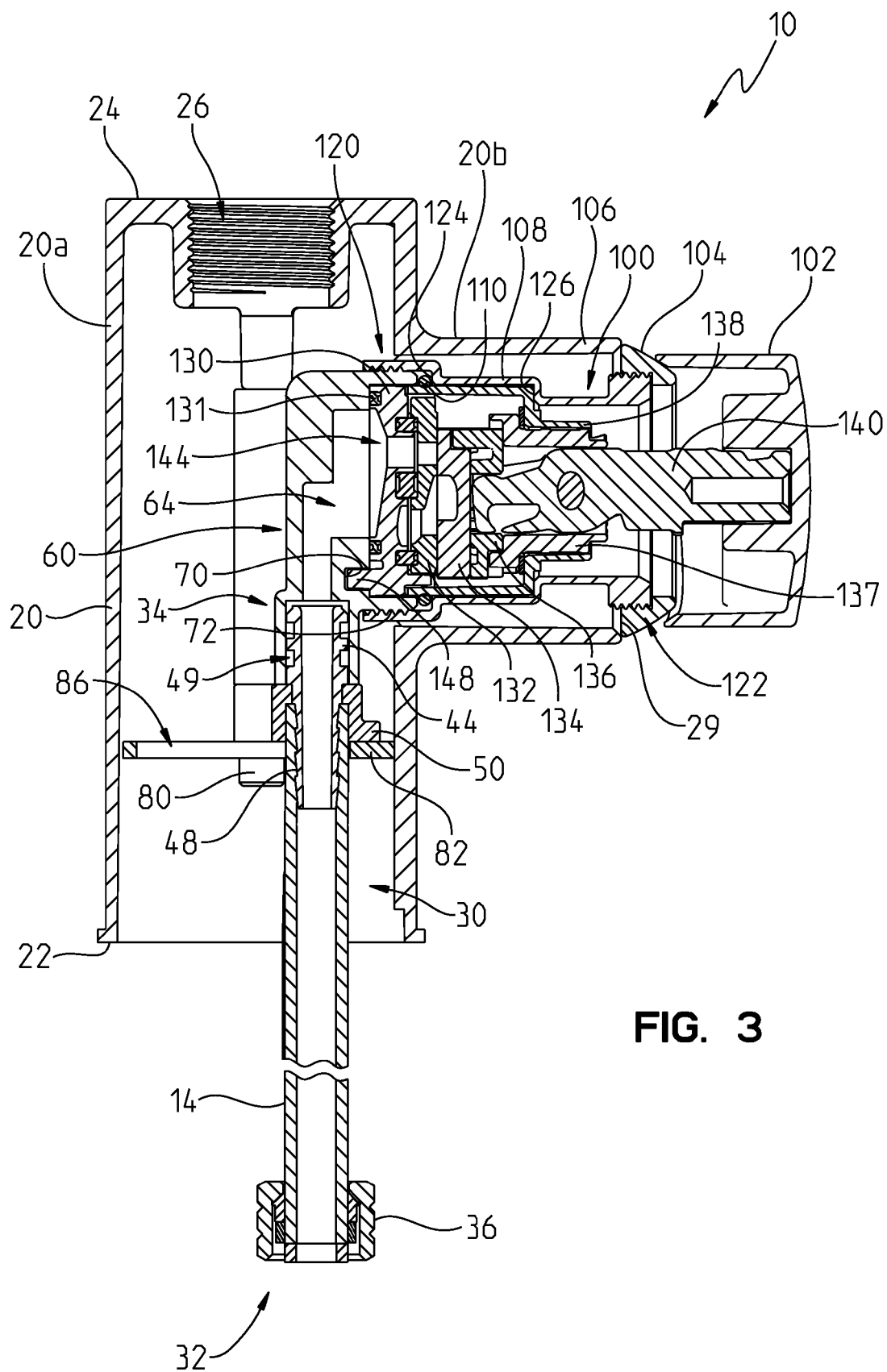
FIG. 3 is a cross-sectional view of the faucet of FIG. 1, taken along line 3-3 of FIG. 1.

As shown in FIG. 2, second end 34 of each tube 12, 14, 16, is received within hub 20. Second end 34 of each tube 12, 14, 16, may receive a corresponding connector, illustratively nipple 42, 44, 46, therein. Each nipple 42, 44, 46, may include external projections or barbs 48, as shown in FIG. 3, for gripping the corresponding tube 12, 14, 16. Also, each nipple 42, 44, 46, may define one or more external, annular grooves 49 for receiving sealing rings (not shown) therein.

The illustrative waterway assembly 30 of faucet 10 also includes a disk-shaped body or collar 50 that surrounds and supports tubes 12, 14, 16, specifically second ends 34 of tubes 12, 14, 16, as shown in FIG. 2. In this arrangement, first ends 32 of tubes 12, 14, 16, hang freely beneath collar 50 and nipples 42, 44, 46, extend above collar 50. Collar 50 may define one or more apertures 52 for receiving screws 80 therethrough, as discussed further below.

To limit contact between the water in faucet 10 and metallic components, waterway assembly 30 may be formed of a flexible, non-metallic material, such as a polymer, illustratively a cross-linkable polymer. As such, waterway assembly 30 is illustratively electrically non-conductive. In one illustrative embodiment, substantially the entire waterway assembly 30 (including tubes 12, 14, 16, nipples 42, 44, 46, and collar 50) is formed of a polyethylene which is subsequently cross-linked to form cross-linked polyethylene (PEX). Other suitable materials that may be used to construct waterway assembly 30 include polyethylene (PE) (such as raised temperature resistant polyethylene (PE-RT)), polypropylene (PP) (such as polypropylene random (PPR)), and polybutylene (PB). It is further envisioned that waterway assembly 30 may be constructed of cross-linked polyvinyl chloride (PVCX) using silane free radical initiators, cross-linked polyurethane, or cross-linked propylene (XLPP) using peroxide or silane free radical initiators. It is within the scope of the present disclosure that the polymer material used to construct waterway assembly 30 may include reinforcing members, such as glass fibers.

Waterway assembly 30 may be constructed by the method set forth in International Patent Application No. PCT/US10/25524 to Nelson et al., filed Feb. 26, 2010, entitled "FAUCET MANIFOLD," the disclosure of which is expressly incorporated by reference herein. In a first step of the illustrative method, nipples 42, 44, 46, are inserted into the corresponding tubes 12, 14, 16, with barbs 48 engaging tubes 12, 14, 16, to resist withdrawal of nipples 42, 44, 46, from the corresponding tubes 12, 14, 16. In a second step of the illustrative method, collar 50 is formed by overmolding collar 50 around second ends 34 of tubes 12, 14, 16, and nipples 42, 44, 46, located therein. This overmolding step forms a material-to-material bond between collar 50 and tubes 12, 14, 16. In a third step of the illustrative method, the assembled waterway assembly 30 is optionally cross-linked.

With reference to FIGS. 2 and 3, the illustrative waterway adapter 60 of faucet 10 fluidly couples waterway assembly 30 to valve assembly 100. Waterway adapter 60 defines hot water inlet channel 62, cold water inlet channel 64, and outlet channel 66. In the illustrated embodiment, channels 62, 64, 66, are bent or L-shaped to couple the vertically disposed waterway assembly 30 to the horizontally disposed valve assembly 100. As shown in FIG. 3, each channel 62, 64, 66, of waterway adapter 60 is sized to receive a corresponding nipple 42, 44, 46, of waterway assembly 30. Providing seals (not shown) in grooves 49 of nipples 42, 44, 46, as discussed above, may resist leakage between waterway assembly 30 and waterway adapter 60.

To further limit contact between the water in faucet 10 and metallic components, waterway adapter 60 may be formed of a non-metallic material, such as a polymer. In one illustrative embodiment, waterway adapter 60 is formed of a glass fiber reinforced polysulfone, such as Udel® GF-110, which is a registered trademark of Solvay Advanced Polymers of Alpharetta, Ga. In another illustrative embodiment, waterway adapter 60 is formed of polyethylene, which may be subsequently cross-linked to form cross-linked polyethylene (PEX). Other suitable materials that may be used to construct waterway adapter 60 include polyethylene (PE) (such as raised temperature resistant polyethylene (PE-RT)), polypropylene (PP) (such as polypropylene random (PPR)), and polybutylene (PB). It is further envisioned that waterway adapter 60 may be constructed of cross-linked polyvinyl chloride (PVCX) using silane free radical initiators, cross-linked polyurethane, or cross-linked propylene (XLPP) using peroxide or silane free radical initiators. It is within the scope of the present disclosure that the polymer material used to construct waterway adapter 60 may include reinforcing members, such as glass fibers.

As discussed further below, waterway adapter 60 defines apertures 68 that receive screws 80 therethrough for coupling waterway adapter 60 to waterway assembly 30 and to hub 20. Also, waterway adapter 60 includes pin holes 70 and externally threaded rim 72 for coupling waterway adapter 60 to valve assembly 100.

As shown in FIG. 2, one or more fasteners, such as screws 80, and mounting plate 82 are provided to secure waterway assembly 30 and waterway adapter 60 within hub 20. Like waterway adapter 60 and collar 50 of waterway assembly 30, mounting plate 82 defines corresponding apertures 84 for receiving screws 80 therethrough. Faucet 10 may be assembled by inserting waterway adapter 60 and waterway assembly 30 upwardly into body portion 20a of hub 20 through the open first end 22 of hub 20. As shown in FIG. 3, waterway adapter 60 and waterway assembly 30 are both narrower than the open first end 22 of hub 20 so that both components may be inserted upwardly into body portion 20a of hub 20 through the open first end 22 of hub 20. When assembled, screws 80 extend through apertures 84 in mounting plate 82, through apertures 52 in collar 50, through apertures 68 in waterway adapter 60, and into internally threaded bores 28 of hub 20, thereby securing waterway assembly 30 and waterway adapter 60 into body portion 20a of hub 20.

Mounting plate 82 also defines central aperture 86 that is sized to accommodate spout tube 11a (FIG. 1) that extends upwardly from tip 38 of outlet tube 16, through body portion 20a of hub 20, and into spout body 11 (FIG. 1) mounted atop hub 20 to dispense water from faucet 10. When assembled, spout tube 11a may extend upwardly through central aperture 86 of mounting plate 82, alongside collar 50 of waterway assembly 30, and alongside waterway adapter 60 until reaching spout body 11 mounted atop hub 20. As shown in FIG. 2, mounting plate 82 entirely encloses central aperture 86. However, mounting plate 82 may also be slitted like mounting plate 82' of FIG. 6 to facilitate assembly of mounting plate 82' onto waterway assembly 30', as discussed further below.

Referring to FIGS. 2 and 3, the illustrative valve assembly 100 of faucet 10 includes handle 102, bonnet 104, sleeve 106, valve body 108, and seal 110. As shown in FIG. 3, valve assembly 100 is supported by valve portion 20b of hub 20 and is removably coupled to waterway adapter 60 located in body portion 20a of hub 20. In this illustrative embodiment, valve assembly 100 may be removed from the open end 29 of valve portion 20b of hub 20 for cleaning or servicing without having to remove waterway adapter 60 from body portion 20a of hub 20.

Sleeve 106 of the illustrative valve assembly 100 includes an internally threaded first end 120 and an externally threaded second end 122. Sleeve 106 also includes first internal shoulder 124 and second internal shoulder 126. In the illustrated embodiment of FIG. 3, valve body 108 is removably coupled to waterway adapter 60 by fitting sleeve 106 over valve body 108 and screwing the internally threaded first end 120 of sleeve 106 onto the externally threaded rim 72 of waterway adapter 60. As shown in FIG. 3, second shoulder 126 of sleeve 106 forces valve body 108 against waterway adapter 60, with first shoulder 124 of sleeve 106 engaging seal 110 to reduce leakage between waterway adapter 60 and sleeve 106. Bonnet 104 may then be screwed onto the externally threaded second end 122 of sleeve 106 for receiving handle 102 thereon.

Figure 4:
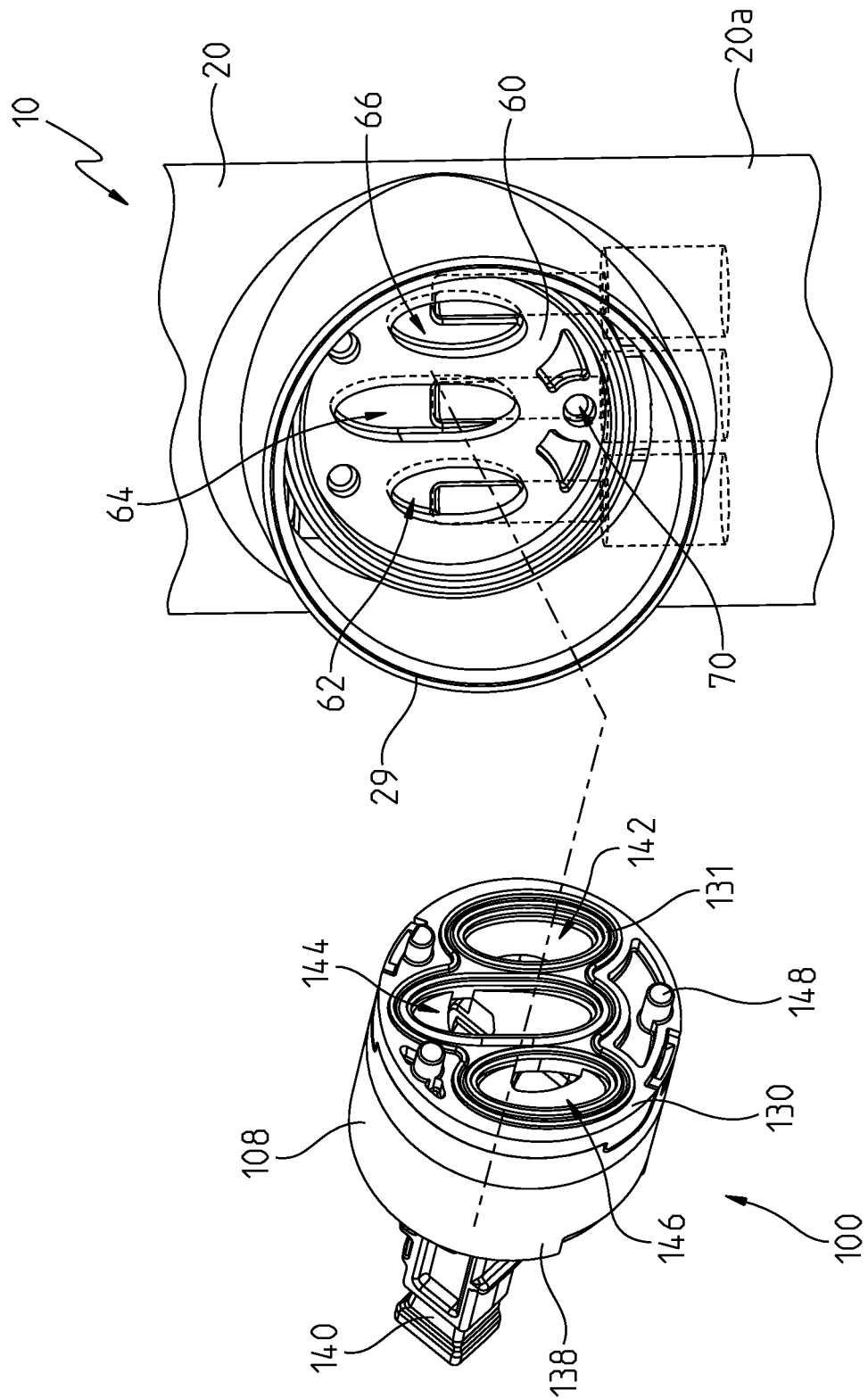
FIG. 4 is an exploded perspective view of a hub and a valve body of the faucet of FIG. 1.
Figure 5:
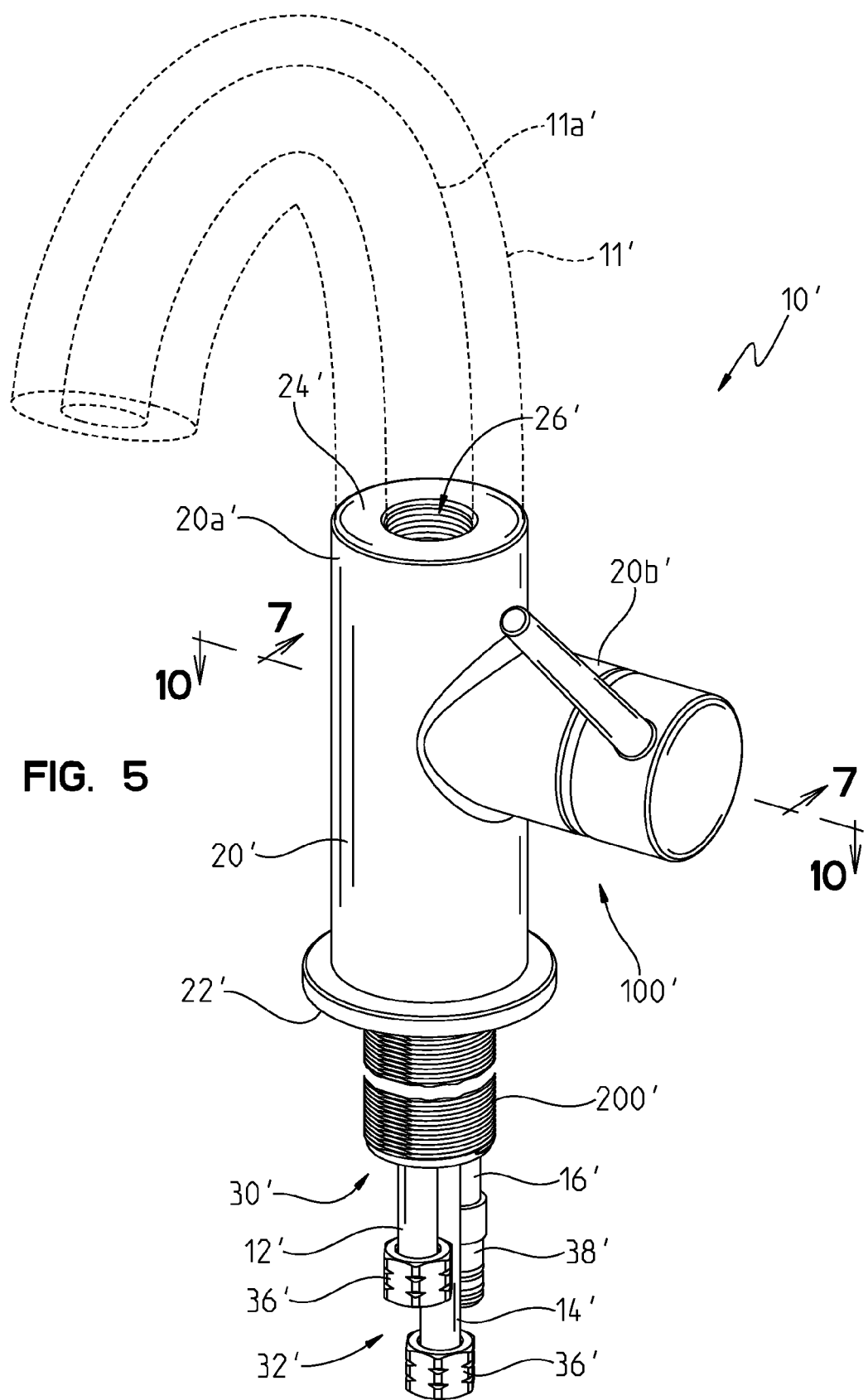
FIG. 5 is a perspective view of another illustrative embodiment faucet of the present disclosure.

Valve body 108 of the illustrative valve assembly 100 includes lower housing 130 having face seal 131 thereon, lower disc 132, upper disc 134, carrier 136, coupling member 137, upper housing 138, and stem 140. Illustratively, both upper disc 134 and lower disc 132 are constructed of a ceramic material or another suitable material, such as stainless steel. As shown in FIG. 4, valve body 108 also includes hot water inlet port 142, cold water inlet port 144, and outlet port 146. When assembled, hot water inlet port 142 of valve body 108 is arranged in fluid communication with hot water inlet channel 62 of waterway adapter 60, cold water inlet port 144 of valve body 108 is arranged in fluid communication with cold water inlet channel 64 of waterway adapter 60, and outlet port 146 of valve body 108 is arranged in fluid communication with outlet channel 66 of waterway adapter 60. Face seal 131 on lower housing 130 of valve body 108 may seal against waterway adapter 60, as shown in FIG. 3, to resist leakage between the components.

One or more first locating elements, illustratively pegs 148 of FIG. 4, extend from valve body 108 to assist with coupling valve body 108 to waterway adapter 60. As shown in FIG. 4, pegs 148 extend from lower housing 130 of valve body 108 and into corresponding pin holes 70 of waterway adapter 60. Positioning each peg 148 of valve body 108 within a corresponding pin hole 70 of waterway adapter 60 may facilitate proper orientation of valve body 108 relative to waterway adapter 60, and as a result, proper orientation of valve body 108 relative to waterway assembly 30. Thus, positioning each peg 148 of valve body 108 within a corresponding pin hole 70 of waterway adapter 60 may facilitate proper orientation of tubes 12, 14, 16, and nipples 42, 44, 46, of waterway assembly 30, channels 62, 64, 66, of waterway adapter 60, and ports 142, 144, 146, of valve body 108, respectively. Also, positioning each peg 148 of valve body 108 within a corresponding pin hole 70 of waterway adapter 60 may improve resistance to torque generated between hub 20, waterway assembly 30, waterway adapter 60, and valve assembly 100.

The illustrative valve assembly 100 may be operated by adjusting handle 102. Adjusting handle 102 actuates stem 140 of valve body 108, which transmits movement of handle 102 to upper disc 134 via carrier 136. As shown in FIG. 3, upper disc 134 is positioned adjacent to lower disc 132 to control the mixing of hot and cold water and the flow rate of water through valve body 108. Therefore, by adjusting handle 102 and moving upper disc 134 relative to lower disc 132, a user is able to selectively vary the temperature and flow rate of water supplied to outlet port 146 of valve body 108 via hot and cold water inlet ports 142, 144, of valve body 108. Because waterway assembly 30 is in fluid communication with valve body 108 via waterway adapter 60, adjusting handle 102 allows a user to selectively vary the temperature and flow rate of water supplied to outlet tube 16 of waterway assembly 30 from hot and cold water inlet tubes 12, 14, of waterway assembly 30. While the illustrative valve assembly 100 is of a movable disc variety, it should be appreciated that other types of valve assemblies may be substituted therefor. For example, a ball-type mixing valve assembly may find equal applicability with the present invention.

In use, hot and cold water flows from hot and cold water supplies (not shown) to valve assembly 100 of faucet 10. More particularly, hot water flows from the hot water supply to hot water inlet port 142 of valve assembly 100 via hot water inlet tube 12 of waterway assembly 30, hot water inlet nipple 42 of waterway assembly 30, and hot water inlet channel 62 of waterway adapter 60. Similarly, cold water flows from the cold water supply to cold water inlet port 144 of valve assembly 100 via cold water inlet tube 14 of waterway assembly 30, cold water inlet nipple 44 of waterway assembly 30, and cold water inlet channel 64 of waterway adapter 60. Then, the hot and cold inlet water streams are mixed and redirected in valve assembly 100. The mixed outlet water stream flows from outlet port 146 of valve assembly 100, through outlet channel 66 of waterway adapter 60, through outlet nipple 46 of waterway assembly 30, and through outlet tube 16 of waterway assembly 30.

Referring next to FIGS. 5-11, another illustrative embodiment faucet 10' is shown including spout body 11' (shown in phantom), hub 20', waterway assembly 30', waterway adapter 60', and valve assembly 100'. Faucet 10' of FIGS. 5-11 includes features similar to those of faucet 10 of FIGS. 1-4, with like reference numerals indicating like elements, except as described below.

Figure 6:
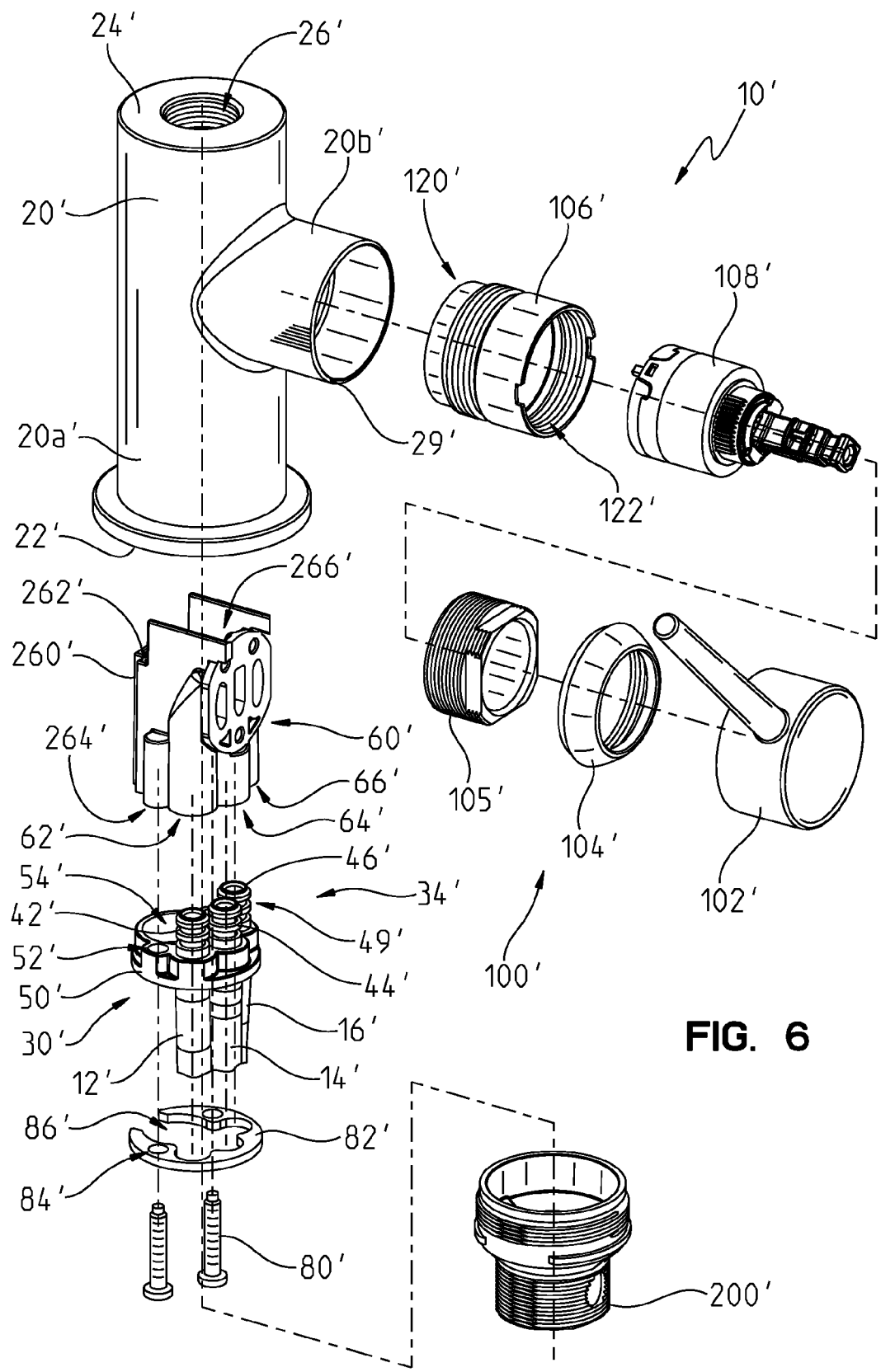
FIG. 6 is an exploded perspective view of the faucet of FIG. 5.
Figure 7:
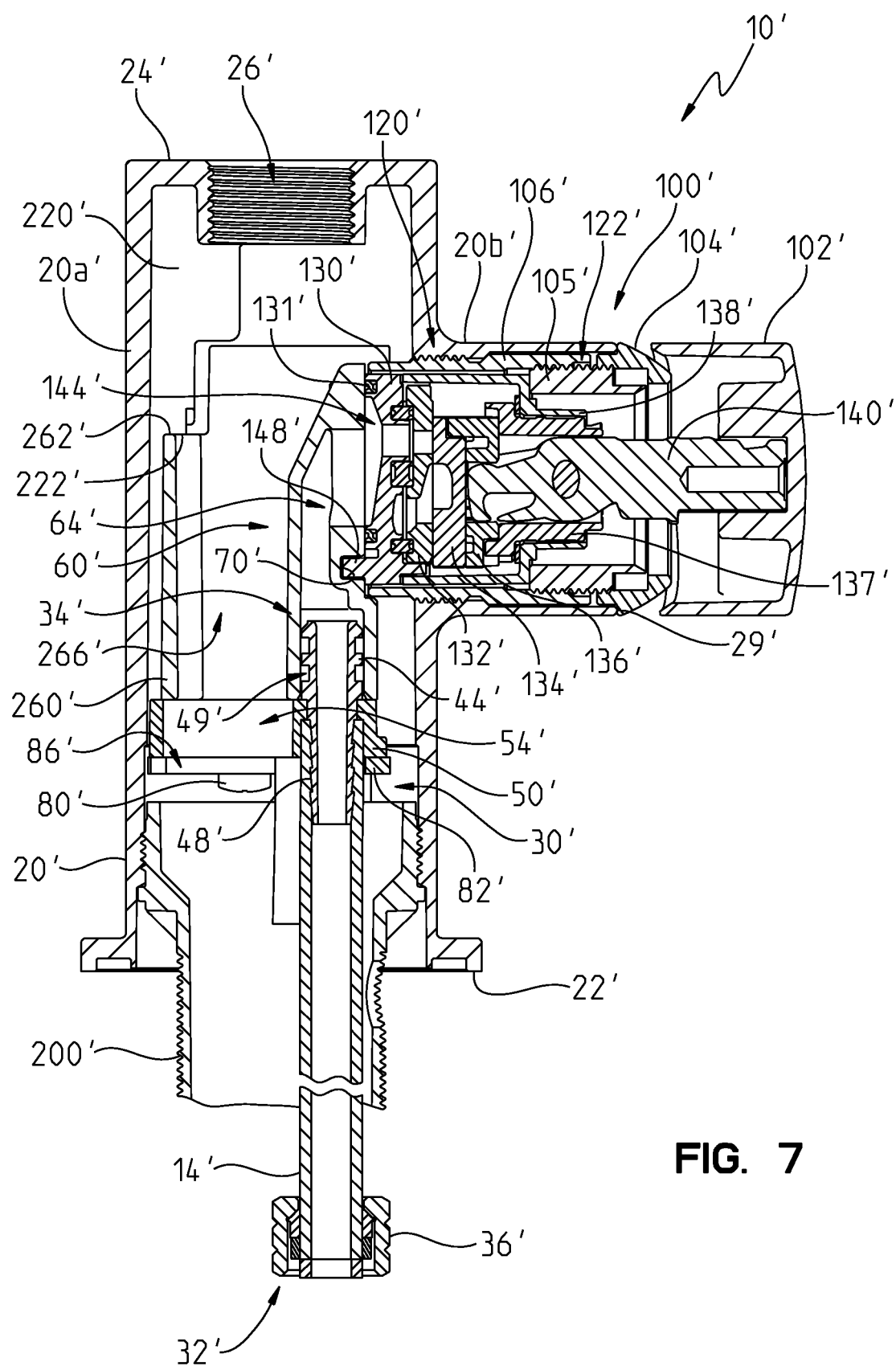
FIG. 7 is a cross-sectional view of the faucet of FIG. 5, taken along line 7-7 of FIG. 5.

With reference to FIGS. 6 and 7, the illustrative hub 20' of faucet 10' includes a vertically disposed body portion 20a' and a horizontally disposed valve portion 20b' extending transversely therefrom. Body portion 20a' of the illustrative hub 20' has an internally threaded and open bottom end 22' that is configured to engage an externally threaded mounting shank 200'. With bottom end 22' of hub 20' resting atop the sink deck (not shown), mounting shank 200' extends beneath the sink deck and may receive a bracket (not shown) for securing faucet 10' onto the sink deck. As shown in FIG. 7, valve portion 20b' of the illustrative hub 20' may be internally threaded, as discussed further below. Like body portion 20a' of hub 20', valve portion 20b' of hub 20' also includes an open end 29'. As shown in FIG. 7, open end 22' is longitudinally disposed and open end 29' is laterally disposed at a substantially 90 degree angle from open end 22'.

With continued reference to FIG. 6, the illustrative waterway assembly 30' of faucet 10' includes a disk-shaped body or collar 50' that surrounds and supports tubes 12', 14', 16'. Collar 50' may define one or more apertures 52' for receiving screws 80' therethrough. Additionally, collar 50' may define a central aperture 54' that is sized to accommodate spout tube 11a' (FIG. 5), as discussed further below.

Figure 8:
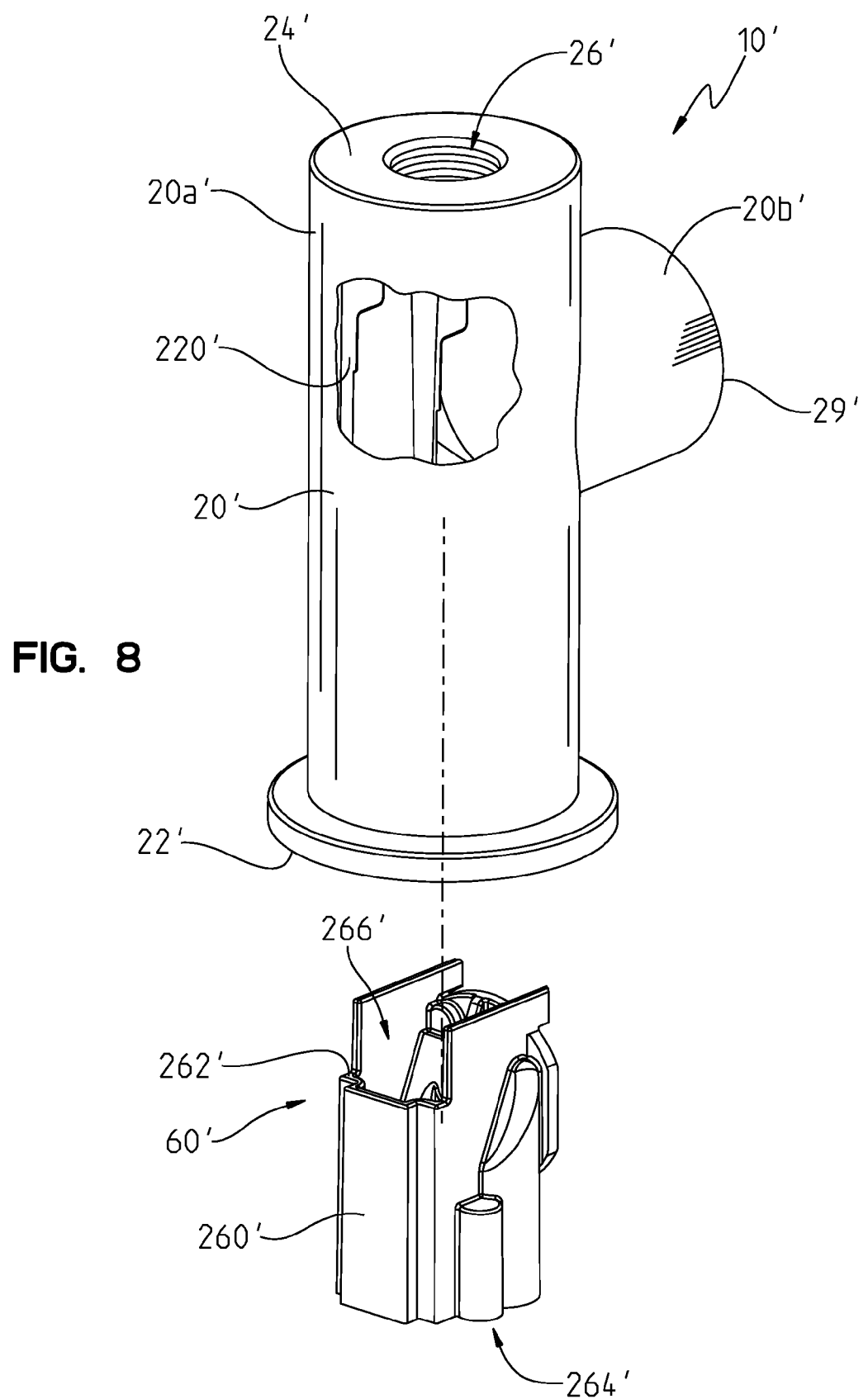
FIG. 8 is an exploded perspective view of a hub and a waterway adapter of the faucet of FIG. 5.
Figure 9:
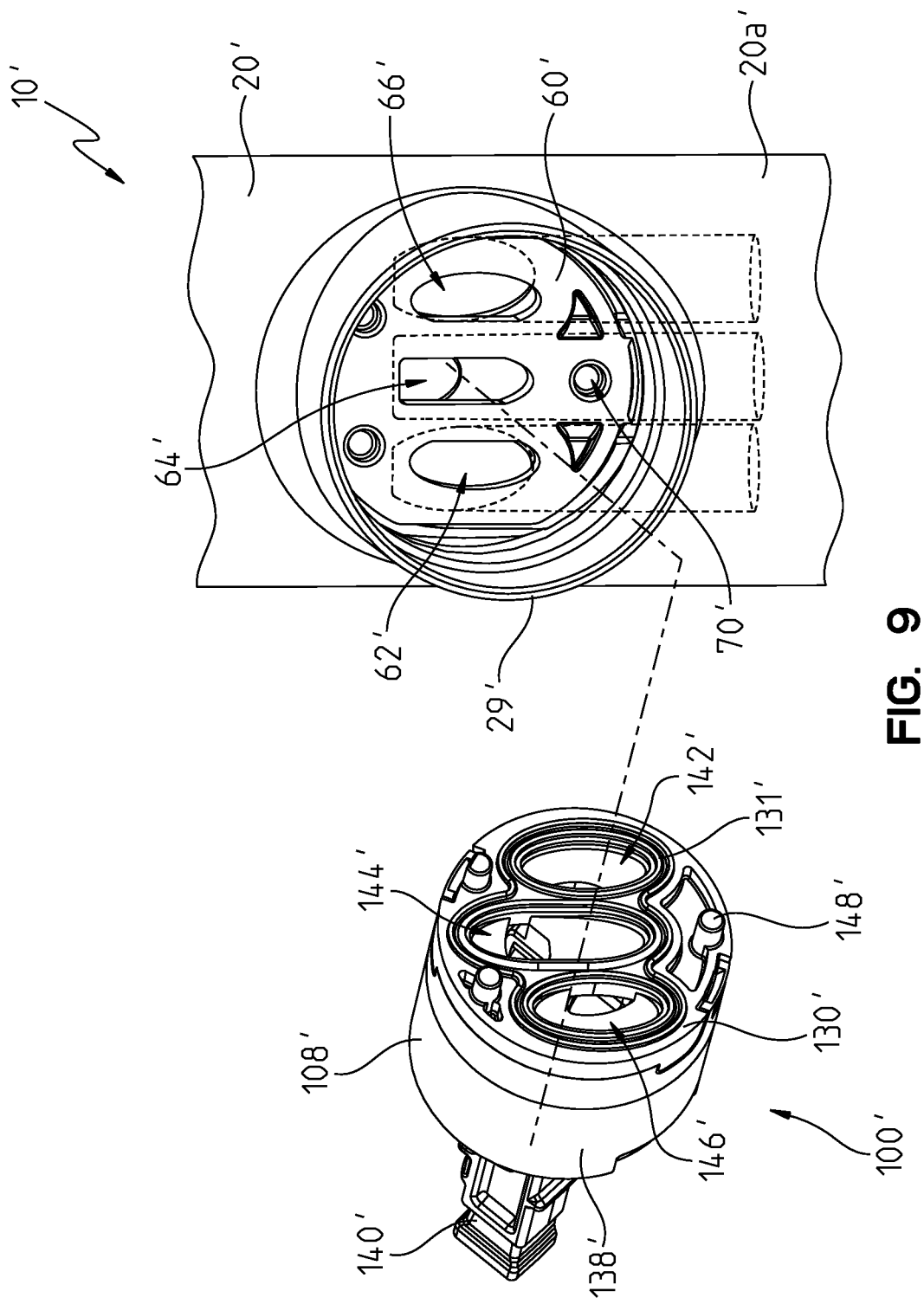
FIG. 9 is an exploded perspective view of the hub and a valve body of the faucet of FIG. 5.

With reference to FIGS. 7 and 8, the illustrative waterway adapter 60' of faucet 10' includes rear protrusion 260' having an upper shoulder 262'. Waterway adapter 60' may also include internally threaded bores 264', as discussed further below. As shown in FIG. 7, waterway adapter 60' is a generally hollow component that defines opening 266' therethrough. Opening 266' extends vertically through waterway adapter 60' and is bordered on one side by channels 62', 64', 66', and on the opposite side by rear protrusion 260'.

As shown in FIG. 6, one or more fasteners, such as screws 80', and mounting plate 82' are provided to secure waterway assembly 30' to waterway adapter 60'. Like collar 50' of waterway assembly 30', mounting plate 82' defines corresponding apertures 84' for receiving screws 80' therethrough. When assembled, screws 80' extend through apertures 84' in mounting plate 82', through apertures 52' in collar 50', and into internally threaded bores 264' of waterway adapter 60', thereby securing waterway assembly 30' to waterway adapter 60'.

Mounting plate 82' also defines central aperture 86' that is sized to accommodate a spout tube 11a' (FIG. 5) that extends upwardly from tip 38' of outlet tube 16', through body portion 20a' of hub 20', and into spout body 11' (FIG. 5) mounted atop hub 20' to dispense water from faucet 10'. When assembled, spout tube 11a' may extend upwardly through central aperture 86' of mounting plate 82', through central aperture 54' of collar 50', and through opening 266' in waterway adapter 60' until reaching spout body 11' mounted atop hub 20'.

As shown in FIG. 6, mounting plate 82' may be slit along central aperture 86' to facilitate assembly of mounting plate 82' onto waterway assembly 30'. In this embodiment, tubes 12', 14', 16', of waterway assembly 30' may be snapped into the slitted mounting plate 82'. Alternatively, it is also within the scope of the present disclosure that mounting plate 82' may entirely enclose central aperture 86', like mounting plate 82 of FIG. 2.

Referring to FIGS. 6 and 7, the illustrative valve assembly 100' of faucet 10' includes handle 102', bonnet 104', nut 105', sleeve 106', and valve body 108'. Sleeve 106' of the illustrative valve assembly 100' includes an externally threaded first end 120' and an internally threaded second end 122'. Nut 105' of the illustrative valve assembly 100' is externally threaded and configured to fit within the internally threaded second end 122' of sleeve 106'.

Figure 10:
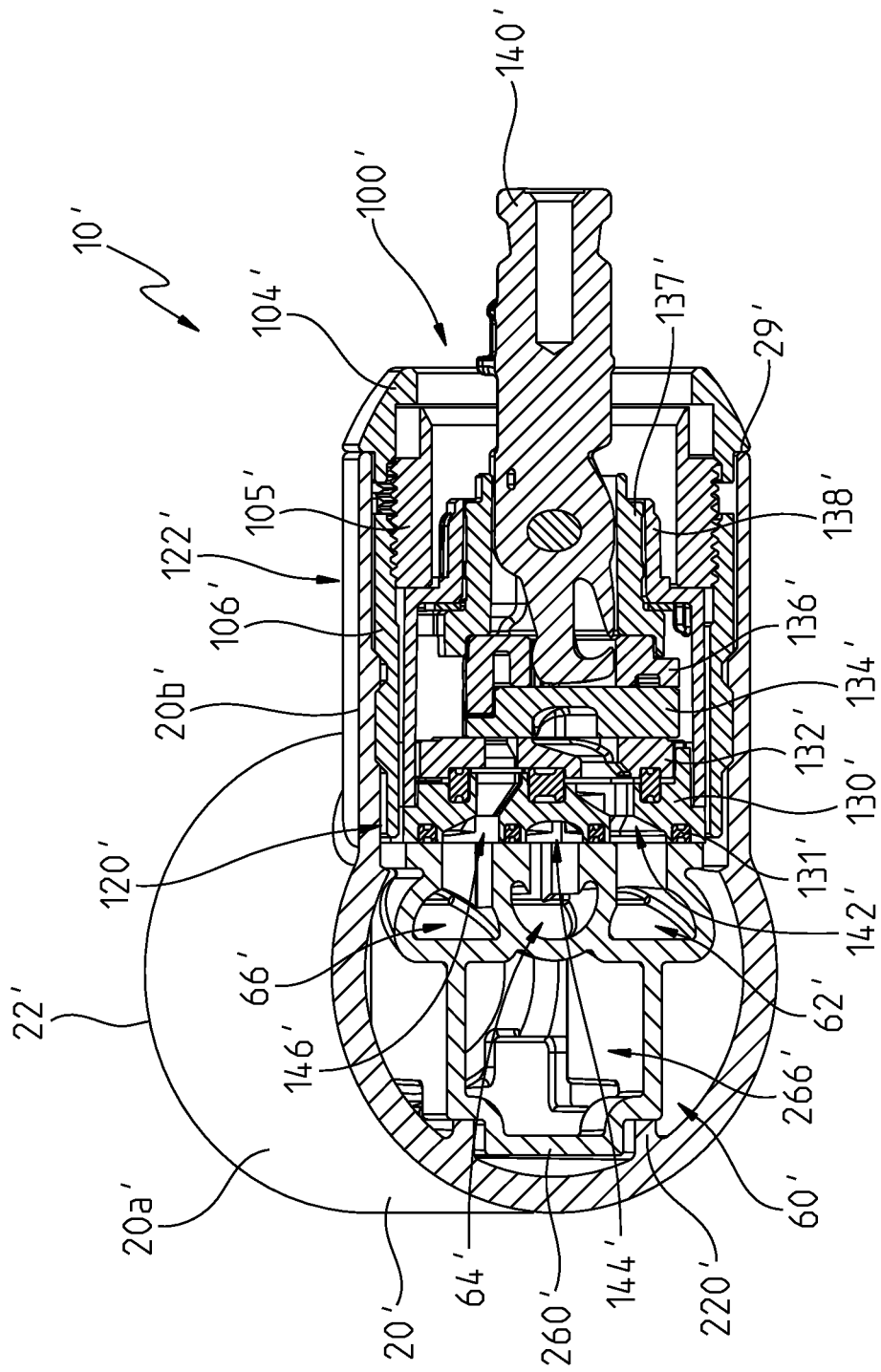
FIG. 10 is a cross-sectional view of the faucet of FIG. 5, taken along line 10-10 of FIG. 5, shown with the waterway adapter inside the hub.
Figure 11:
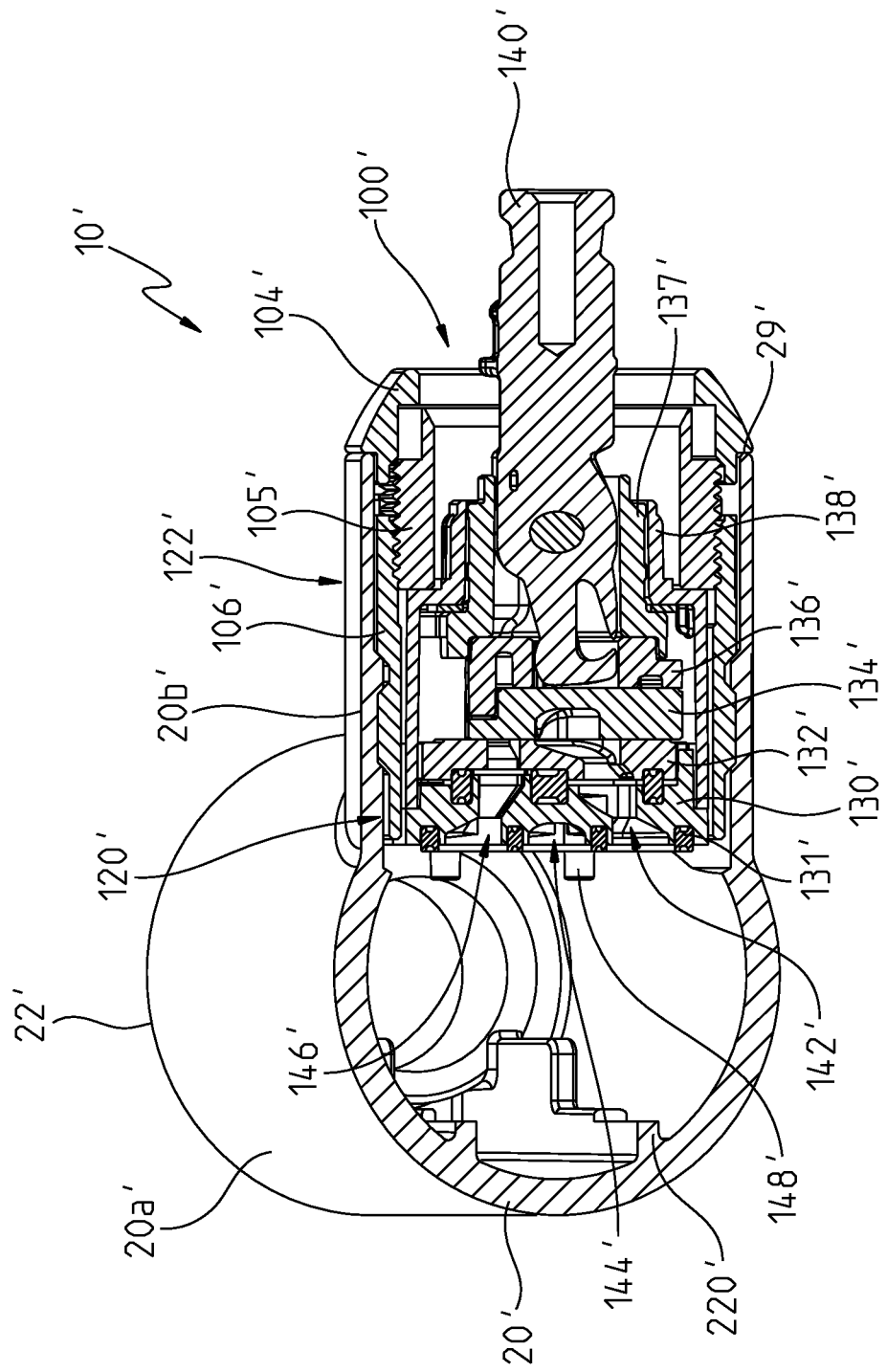
FIG. 11 is a cross-sectional view similar to FIG. 10, shown with the waterway adapter removed from the hub.

Referring next to FIGS. 7-11, hub 20' of the illustrative faucet 10' includes internal rails 220' that are sized to receive and center rear protrusion 260' of waterway adapter 60' therebetween. Each rail 220' of hub 20' includes a downward-facing stop 222' that is configured to abut a corresponding upper shoulder 262' of waterway adapter 60'. Faucet 10' may be assembled by inserting waterway assembly 30' and waterway adapter 60' upwardly into body portion 20a' of hub 20' through the open first end 22' of hub 20'. As shown in FIG. 7, waterway adapter 60' and waterway assembly 30' are both narrower than the open first end 22' of hub 20' so that both components may be inserted upwardly into body portion 20a' of hub 20' through the open first end 22' of hub 20'. When upper shoulder 262' of waterway adapter 60' abuts stop 222' of hub 20', as shown in FIG. 7, the installer knows that waterway adapter 60' is properly positioned within body portion 20a' of hub 20' to align with valve assembly 100', both horizontally and vertically. Then, sleeve 106' may be screwed into valve portion 20b' of hub 20' such that first end 120' of sleeve 106' forces waterway adapter 60' into contact with rails 220' of hub 20', as shown in FIG. 10. With sleeve 106' tightened in place, waterway adapter 60' and waterway assembly 30' coupled thereto may be frictionally retained within hub 20' and may resist falling through open end 22' of hub 20' under gravitational force.

As shown in FIG. 7, valve assembly 100' is supported by valve portion 20b' of hub 20' and is removably coupled to waterway adapter 60' located in body portion 20a' of hub 20'. In this illustrative embodiment, valve assembly 100' may be removed from the open end 29' of valve portion 20b' of hub 20' for cleaning or servicing without having to remove waterway adapter 60' from body portion 20a' of hub 20'.

Valve body 108' may be removably coupled to waterway adapter 60' by fitting nut 105' over valve body 108', as shown in FIG. 7. In this arrangement, the externally threaded nut 105' may be screwed into the internally threaded second end 122' of sleeve 106'. Nut 105' may force valve body 108' tightly against waterway adapter 60'. Bonnet 104' may then be screwed onto the externally threaded nut 105' for receiving handle 102' thereon.

Although the invention has been described in detail with reference to certain preferred embodiments, variations and modifications exist within the spirit and scope of the invention as described and defined in the following claims.

The invention claimed is:

1. A fluid delivery device including:
   a generally hollow hub including a body portion having a longitudinally disposed first open end and a laterally disposed valve portion having a second open end, the body portion of the hub configured to rest atop a surface, the second open end of the valve portion disposed substantially perpendicular to the first open end of the body portion;
   a waterway assembly including an inlet transport component and an outlet transport component;
   a valve assembly removably coupled to the valve portion of the hub, the valve assembly including an inlet port and an outlet port;
   at least one fastener; and
   a waterway adapter removably coupled to the body portion of the hub, the waterway adapter sized for insertion into the first open end of the body portion, the waterway adapter defining an inlet channel and an outlet channel, the inlet channel of the waterway adapter fluidly coupling the inlet transport component of the waterway assembly to the inlet port of the valve assembly, and the outlet channel of the waterway adapter fluidly coupling the outlet transport component of the waterway assembly to the outlet port of the valve assembly, the inlet transport component of the waterway assembly being removably coupled to the inlet channel of the waterway adapter via the at least one fastener, and the outlet transport component of the waterway assembly being removably coupled to the outlet channel of the waterway adapter via the at least one fastener.

2. The fluid delivery device of claim 1, wherein the waterway adapter is constructed of a polymeric material.

3. The fluid delivery device of claim 1, wherein the valve assembly is sized for insertion into the second open end of the valve portion.

4. The fluid delivery device of claim 1, wherein the hub supports the waterway adapter independently of the valve assembly such that the waterway adapter is supported by the hub when the valve assembly is removed from the hub.

5. The fluid delivery device of claim 1, wherein the waterway assembly is arranged vertically and the valve assembly is arranged horizontally, and wherein the inlet channel and the outlet channel of the waterway adapter are L-shaped to fluidly couple the vertically arranged waterway assembly to the horizontally arranged valve assembly.

6. The fluid delivery device of claim 1, wherein the fastener extends through the waterway adapter and into the hub to secure the waterway adapter within the hub.

7. The fluid delivery device of claim 1, wherein the fastener is inserted through the first open end of the body portion of the hub.

8. A fluid delivery device including:
   a hub including a body portion disposed along a generally vertical axis and a valve portion disposed along a generally horizontal axis, the body portion of the hub including an internal wall that defines a hollow interior of the hub, the body portion further including an open top end and an open bottom end, the generally vertical axis extending centrally through the open top and bottom ends of the body portion of the hub;
   a waterway assembly including an inlet transport component and an outlet transport component;
   a valve assembly configured for insertion into the valve portion of the hub along the generally horizontal axis, the valve assembly including an inlet port and an outlet port; and
   a waterway adapter configured for insertion into the body portion of the hub along the generally vertical axis, the waterway adapter defining an inlet channel and an outlet channel, the inlet channel of the waterway adapter fluidly coupling the inlet transport component of the waterway assembly to the inlet port of the valve assembly, and the outlet channel of the waterway adapter fluidly coupling the outlet transport component of the waterway assembly to the outlet port of the valve assembly, the waterway adapter being forced against the internal wall of the hub to resist removal of the waterway adapter from the body portion of the hub along the generally vertical axis, the generally vertical axis of the hub passing within the waterway adapter when the waterway adapter is forced against the internal wall of the hub.

9. The fluid delivery device of claim 8, wherein the waterway adapter is constructed of a polymeric material.

10. The fluid delivery device of claim 8, wherein the internal wall of the hub includes a vertical rail that projects into the hollow interior of the hub and that guides insertion of the waterway adapter into the body portion of the hub along the generally vertical axis.

11. The fluid delivery device of claim 10, wherein the waterway adapter is forced against the vertical rail to resist removal of the waterway adapter from the body portion of the hub along the generally vertical axis.

12. The fluid delivery device of claim 8, further including a threaded component that screws into the valve portion of the hub to force the waterway adapter into contact with the internal wall of the hub.

13. The fluid delivery device of claim 8, wherein the valve portion of the hub extends in a forward direction from the body portion of the hub, and wherein the internal wall of the hub is located rearward of the waterway assembly and rearward of the valve assembly such that the internal wall of the hub is located opposite the valve portion of the hub.

14. The fluid delivery device of claim 8, wherein the waterway adapter defines a vertical opening that is sized to receive a spout tube, the vertical opening located between the internal wall of the hub and the valve assembly.

15. A fluid delivery device including:
   a hub;
   a waterway assembly including:
      an inlet transport component;
      an outlet transport component;
      a collar located inside the hub, the collar supporting the inlet and outlet transport components;
      an inlet nipple fluidly coupled to the inlet transport component and extending beyond the collar, the inlet nipple including a plurality of external barbs that engage the inlet transport component; and
      an outlet nipple fluidly coupled to the outlet transport component and extending beyond the collar, the outlet nipple including a plurality of external barbs that engage the outlet transport component;
   a valve assembly including an inlet port and an outlet port; and
   a waterway adapter coupled to the hub, the waterway adapter defining an inlet channel and an outlet channel, the inlet channel of the waterway adapter receiving the inlet nipple of the waterway assembly to fluidly couple the inlet transport component of the waterway assembly to the inlet port of the valve assembly, and the outlet channel of the waterway adapter receiving the outlet nipple of the waterway assembly to fluidly couple the outlet transport component of the waterway assembly to the outlet port of the valve assembly.

16. The fluid delivery device of claim 15, wherein the collar of the waterway assembly rests beneath the waterway adapter.

17. The fluid delivery device of claim 15, wherein each of the inlet and outlet nipples includes external barbs that engage the corresponding inlet and outlet transport components.

18. The fluid delivery device of claim 15, wherein the hub includes a vertical rail that projects inwardly from an internal wall of the hub and into a hollow interior of the hub, the vertical rail guiding insertion of the waterway adapter into the hub along a generally vertical axis.

19. The fluid delivery device of claim 18, wherein the waterway adapter is forced against the vertical rail to resist removal of the waterway adapter from the hub along the generally vertical axis.

20. The fluid delivery device of claim 18, further including a threaded component that screws into a valve portion of the hub to force the waterway adapter into contact with the vertical rail of the hub.

* * * * *